United States Patent [19]
Larrieu

[11] Patent Number: 5,922,031
[45] Date of Patent: Jul. 13, 1999

[54] LOW-ALTITUDE PILOTING METHOD

[75] Inventor: Bertrand Larrieu, Verrieres le Buisson, France

[73] Assignee: Sextant Avionique, Velizy Villacoublay, France

[21] Appl. No.: 08/754,009

[22] Filed: Nov. 20, 1996

[30] Foreign Application Priority Data

Nov. 21, 1995 [FR] France .................................. 95 13786

[51] Int. Cl.⁶ ................................................ G06F 165/00
[52] U.S. Cl. .................................. 701/3; 342/65; 342/64; 342/63; 342/407; 364/448; 364/420; 364/450; 364/424; 364/443; 364/444; 395/10; 395/125; 340/980; 340/970; 348/144
[58] Field of Search ................................ 701/3; 342/407, 342/65, 64, 63; 364/448, 420, 424, 443, 444; 395/10, 125; 340/980, 970; 348/144

[56] References Cited

U.S. PATENT DOCUMENTS

| | | | |
|---|---|---|---|
| 4,144,571 | 3/1979 | Webber | 364/450 |
| 4,692,869 | 9/1987 | King et al. | 364/448 |
| 4,760,396 | 7/1988 | Barney et al. | 342/65 |
| 5,444,618 | 8/1995 | Seki et al. | 364/420 |
| 5,526,000 | 6/1996 | Chazelle et al. | 342/407 |
| 5,774,818 | 6/1998 | Pages | 701/3 |

FOREIGN PATENT DOCUMENTS

| | | |
|---|---|---|
| 2607948 | 6/1988 | France . |
| 2658636 | 8/1991 | France . |

OTHER PUBLICATIONS

James A. Williams, et al. "Effects of Integrated Flight Path and Terrain Displays on Controlled Flight into Terrain", International Conference on Systems, Man and Cybernetics, vol. 1, 17, (pp. 709–714), Oct. 17, 1993.
Patent Abstracts of Japan, vol. 8, No. 183, JP59075113—Apr. 27, 1984.
Patent Abstracts of Japan, vol. 15, No. 224, JP3064787—Mar. 20, 1991.

*Primary Examiner*—William A. Cuchlinski, Jr.
*Assistant Examiner*—Sean D. Saunders
*Attorney, Agent, or Firm*—Oblon, Spivak, McClelland, Maier & Neustadt, P.C.

[57] ABSTRACT

In a method for the piloting of an aircraft, enabling low-altitude flight by setting up a tangent with the relief to be overflown, the aircraft pilot determines the goals to be attained on a cartographic screen. This is done in enabling a computer, using altimetrical data, to define a ground profile and then a set of straight lines at a tangent to said ground profile. A method of this kind has the advantage of enabling an optimized flight plan to be reconfigured directly, when the pilot comes up against a threat that makes it necessary to change the pre-set flight plan. Application to military transport aircraft.

7 Claims, 3 Drawing Sheets

LOW-ALTITUDE PILOTING METHOD

BACKGROUND OF THE INVENTION

1. Field of the Invention

The field of the invention is that of aircraft and more particularly that of military transport aircraft which, in order to carry out tactical missions efficiently, require systems for flying at low altitude (typically below 500 ft.) thus enabling them to take advantage of the masking offered by the relief features that they overfly.

2. Description of the Prior Art

At the present time, there are low-altitude flying methods, computed in real time for armed aircraft and especially a method described by the present Applicant in the patent application published under No. 2 658 636. However, this type of method for piloting an aircraft in flight at very low altitude cannot be transposed to the case of military transport aircraft subjected to different constraints owing to their characteristics in terms of mass, inertia, maneuvering capacity or again vulnerability.

Furthermore, a military transport aircraft cannot subject the personnel that it is likely to carry to excessively sudden changes in trajectory, trajectories with excessively narrow radii of curvature and excessively frequent alternations of diving and nosing up.

SUMMARY OF THE INVENTION

This is why the invention proposes a method of real-time piloting that is especially well suited to military transport aircraft, and meets the constraints dictated by these aircraft.

This method enables the pilot of the aircraft to make a real-time determination of a new flight plan whenever a threat arises making it necessary to change a pre-set flight plan.

This method relies on the specifying of a trajectory with variable slopes setting up a maximum tangent to a relief feature to be overflown on the basis of data elements enabling the preliminary preparation of a path in a horizontal corridor defined at the level of the ground to be overflown. It enables the real-time definition of an optimized trajectory meeting the aircraft constraints while enabling the aircraft to fly at the lowest possible altitude with respect to a given relief feature.

More specifically, an object of the invention is a method of piloting an aircraft in low-altitude flight, comprising the following steps:

- the determining, by the aircraft pilot, of goals $B_i$ on a cartographic screen so as to define a flight plan subdivided into segments $s_i$, each segment $s_i$ being defined between a goal $B_i$ and a goal $B_{i+1}$;
- the determining, by a computer C in the aircraft, of horizontal paths $TH_i$ along the segments $s_i$;
- the determining by the computer C of the ground profile to be overflown, said ground profile being defined on the basis of a set of highest points $P_{ij}$ located on a path $TH_i$ between a goal $B_i$ and a goal $B_{i+1}$;
- the determining of a series of straight lines $Z_{io}S'_{i1}, \ldots, S'_{ik}S'_{ik+1}, S'_{in}Z_{in}$, with slopes $\Lambda_{ik}$ that are at a tangent to the ground profile;

$Z_{io}$ being the altitude of the aircraft positioned at the beginning of the segment, $S'_{i1}, \ldots, S'_{ik}, \ldots S'_{in}$ being the determinant peaks defined among the points $P_{ij}$, $Z_{in}$ being an altitude of the aircraft sought in the vicinity of the end of the segment, said straight lines defining the flight instructions in vertical path.

It must be noted that the results of the computation of paths with variable slopes consist of the determining of a series of determinant peaks $S'_i, \ldots, S'_n$ distributed between the goals $B_i$ and $B_{i+1}$, the slopes of the straight lines that connect two determinant peaks being the slopes $\Lambda_{ik}$.

To prepare this type of path, it may be particularly useful to proceed iteratively by defining a first determinant peak $S_{i1}$ on the entire segment $s_i$ and then, when the distance between the beginning of the segment $S_{i1}$ and the end of the segment is sufficient, defining other determinant peaks on either side of the first determinant peak, and thus perform a step-by-step subdivision of a previously defined sub-segment into sub-segments until a minimum distance of sub-segments is obtained.

This is why, advantageously, the piloting method may consist successively:

- in the determining of a first determinant peak $S_{i1}$ on the entire navigation segment considered, giving a path with a slope $\gamma_{i1}$;
- if the distance between the beginning of the segment and the point $S_{i1}$ is greater than a fixed distance by at least $2D_{minseg}$, $D_{minseg}$ being a minimum distance between two points of change of slope and being defined as an operational constraint to prevent excessively frequent changes in slope, in the determining of a second determinant peak $S_{i2}$ giving no longer a straight line with a slope $\gamma_{i1}$ but two straight lines with slopes $\gamma_{i2}$ and $\gamma'_{i2}$ on either side of the point $S_{i2}$;
- if the distance between $S_{i1}$ and the end of the segment is also greater than $2D_{minseg}$, in the determining of a third determinant peak $S_{i3}$ and therefore of two paths with slopes $\gamma_{i3}$ and $\gamma'_{i3}$;
- in the iterating of the search for determinant peaks in each newly defined sub-segment until the constraint on $2D_{minseg}$ is reached.

According to a first variant of the invention, the pilot of the aircraft can act with a joystick type of manual control to display the goals to be attained on the cartographic screen. According to a second variant of the invention, the pilot of the aircraft may act on a touch screen. According to a third variant, the pilot may act by voice command.

The flight instructions determined according to the method of the invention by the computer may be presented to the pilot in different ways.

According to one variant of the invention, the cartographic screen may advantageously comprise a window in which there are presented general flight instructions showing the totality of the straight lines $(Z_o, S'_{i1})$.

The flight instructions are also presented at specific instants on a head-up visor that regularly displays short-term flight instructions.

BRIEF DESCRIPTION OF THE DRAWINGS

The invention will be understood more clearly and other advantages shall appear from the following description, given by way of a non-restrictive example with reference to the appended figures, of which.

MORE DETAILED DESCRIPTION

Figure 1:
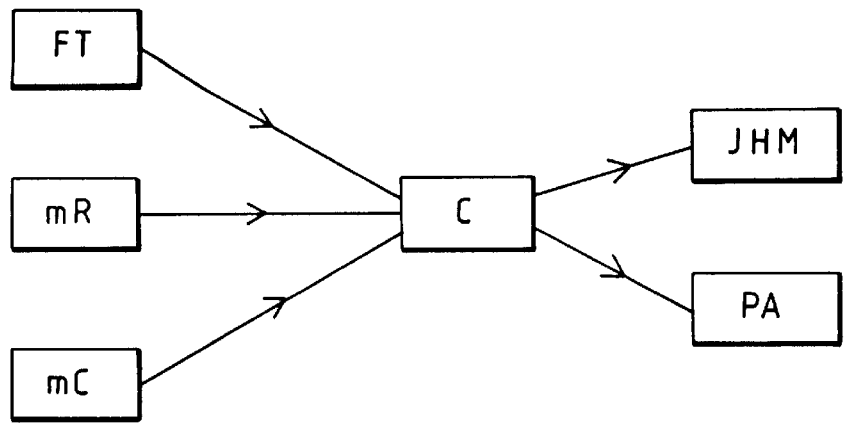
FIG. 1 illustrates a block diagram of a device enabling the implementation of the method proposed in the invention.

To implement the low-altitude piloting method according to the invention, a block diagram of a device is shown in FIG. 1.

The block diagram proposed in this figure shows that the pilot has, for example on board his aircraft, an on-board ground file FT giving a matrix in relief with altitudes of the terrain to be overflown, this ground file being complemented by ground-air radar means mR enabling the identification of the obstacles that may not have been integrated into the ground file. The preparation of a ground map that is even more precise may be obtained by means of additional sensors, for example sensors of the radioprobe mC type.

The ground file may be presented to the file in the form of a cartographic screen on which the pilot selects the different goals $B_i$ with a view to defining a real-time ground plan taking account of the obstacles that are presented to him.

When two goals $B_i$ and $B_{i+1}$ are defined and demarcate a segment $s_i$, a horizontal path $TH_i$ is then defined by means of a navigation computer. Highest points $P_{ij}$ are extracted from on-board altimetrical data.

Using these different data elements, the variable slope paths are prepared in a computer C to enable low-altitude flight designed to ensure automatic or semi-automatic operation in flight director mode.

In every case, the entire path that follows the ground with variable slope and, therefore, all the piloting instructions to be followed are firstly presented to the crew through standard man/machine interface means on the instrument panel and secondly sent to the automatic piloting system PA.

The instruments panel is fitted out with the cartographic screen which may include a window showing the computed paths that are tangential to the relief, this display extending over distances of several kilometers. At the same time, a head-up visor provides flight instructions that change every few milliseconds and give the pilot a precise indication of the maneuvers to be performed.

More precisely, the low-altitude piloting method that is an object of the present invention consists in redefining the pre-established flight plan by means of the on-board field file and in subdividing the new navigation flight plan into segments. Each navigation segment $s_i$ is thus demarcated between two goals to be attained $B_i$ and $B_{i+1}$; the segments are examined one by one, according to the route of the flight plan. The ground path along the navigation segments $s_i$ is known as is the section of the corresponding ground.

Advantageously, the processing of a segment considers more broadly a navigation segment $s_i$ by integrating into it an extended portion or shoulder portion $t_i$ that corresponds to a part of the consecutive segment $s_{i+1}$, so as to provide a certain path continuity when going from one segment to another, the search for the determinant peaks being therefore conducted on an interval $(s_i+t_i)$.

For the last segment to be considered in the flight plan, the shoulder portion may correspond to the continuity of the segment since no segment $s_{i+1}$ is then known.

Figure 2:
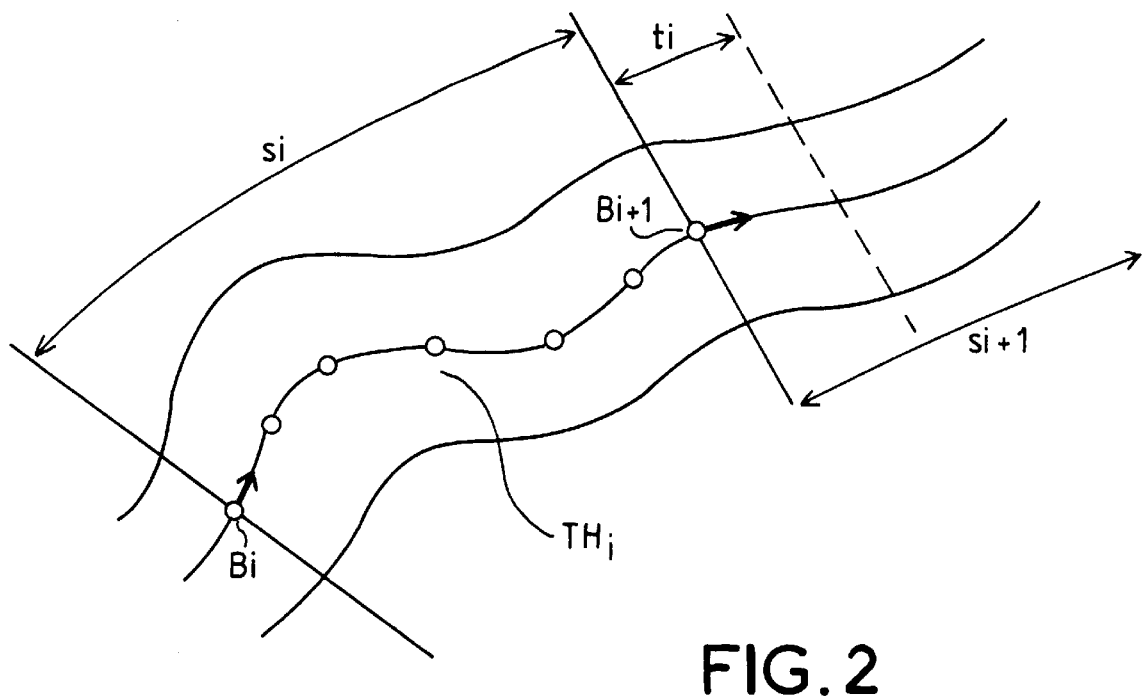
FIG. 2 gives a schematic view of a flight plan defined in the horizontal plane with the goals set by the pilot.

FIG. 2 illustrates the trace $TH_i$ on the ground to be followed during the piloting of the aircraft. This trace is defined prior to the determining of the paths with variable slopes. To take account of the localization errors, a horizontal corridor is defined around the ground trace. The points $B_i$ and $B_{i+1}$ demarcating navigation segments have been defined by the pilot.

The ground profile for its part comes from the altimetrical ground file complemented as the case may be by a radar map.

Figure 3:
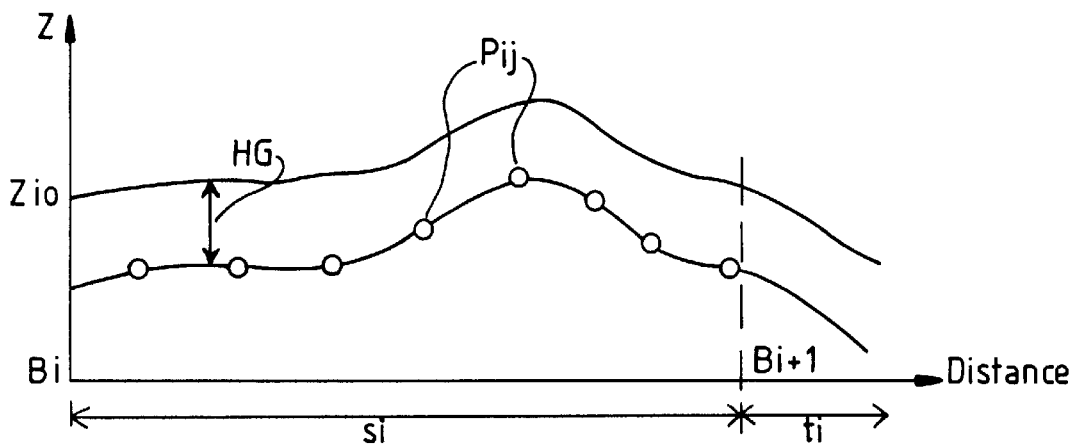
FIG. 3 gives a schematic view of the section of ground to be overflown corresponding to a navigation segment complemented by a shoulder portion.

FIG. 3 illustrates an exemplary ground profile to be overflown along a navigation segment $s_i$ complemented by a shoulder portion $t_i$.

The points $P_{ij}$ correspond to points of known greater altitude that are raised by a safety height HG enabling the definition of a safety profile that the pilot will seek to overfly as closely as possible, at each point.

In the search for the flight plan and the computation of the vertical paths, certain constraints need to be permanently complied with. These constraints are of two types: operational constraints and so-called "aircraft" constraints.

The operational constraints that are defined for any flight plan are:
  a safety height HG to be met with respect to the relief;
  a minimum distance of a sub-segment $D_{minseg}$ enabling excessively frequent changes in slope to be avoided;
  a maximum change in slope $\Delta\gamma_{max}$ on either side of a slope changing point;
  a minimum difference in slope $\epsilon\gamma_{min}$ on either side of a slope changing point to have identifiable flight instructions;
  a minimum distance between two determinant peaks $S_i$ and $S_{i+1}$ to carry out a new search for a determinant peak $S_{i+2}$.

The "aircraft" constraints are essentially the maximum nosing-up slope, $\gamma_{max}$, and the maximum diving slope, $\gamma_{min}$, to which the aircraft may be subjected.

In order to simplify the description of the low-altitude piloting method that is an object of the invention, three examples may be envisaged and described in detail:
  Case 1: the navigation segment $s_i$ is a short segment with a typical length smaller than $2D_{minseg}$.
  Case 2: the navigation segment $s_i$ is an average segment with, at most, one slope break, namely a distance segment $D_{segment}$ such that:
  $2D_{minseg} \leq D_{segment} \leq 3D_{minseg}$
  Case 3: the navigation segment $s_i$ is a long segment with more than one slope break, giving typically a segment distance $D_{segment} \geq 3D_{minseg}$.

Case 1: Short navigation segment $s_i$

The navigation segments have the characteristic of being travelled through with a constant slope that it is sought to optimize according to the method of the invention.

For this purpose, a search is made for the determinant peak $S_{i1}$ that consists in identifying, on the basis of the altitude $Z_{io}$ of the aircraft at the beginning of the segment, the slope $\gamma_{i1}$ enabling a tangent to be set up with the raised relief of the safety height HG.

To carry out this search efficiently, it is possible to use the following search algorithm:
  $\gamma_{i1}$ is initialized at $-\infty$,
  at each point $P_{ij}$ of the segment $s_i+t_i$: $\gamma_{ij}$ is computed
    if $\gamma_{ij} > \gamma_{ij}$, then $\gamma_{i1}$ ($\gamma_{i1} = \gamma_{ij}$) is saved
  it is ascertained that the constraint of maximum slope change is complied with on the basis of the slope $\gamma_{io}$ at the beginning of the segment at the altitude $Z_{io}$, giving $|\gamma_{i1}-\gamma_{io}|>|\Delta\gamma_{max}|$ then $\gamma_{i1}=\gamma_{io}+\Delta\gamma_{max}$ it is also ascertained that the slope thus computed is sandwiched between minimum and maximum slopes:

if $\gamma_{i1}<\gamma_{min}$ then $\gamma_{i1}=\gamma_{min}$
if $\gamma_{i1}>\gamma_{max}$ then $\gamma_{i1}=\gamma_{max}$ it is then possible, on a short segment, to determine a instructed value of slope $y_{i1}$ corresponding to the straight line that must be followed by the aircraft between the two fixed goals $B_i$ and $B_{i+1}$.

Case 2: Mean navigation segment $s_i$

In an initial stage, a search is made for the determinant peak $S_{i1}$ in the same way as in the case of a short segment.

Thus, according to the same type of algorithm, in ascertaining that all the constraints are truly met, on the entire segment, there are obtained a first determinant peak $S_{i1}$ and a slope $\gamma_{i1}$ between the beginning and the end of the segment.

Several possibilities may then arise:

1) The determinant peak $S_{i1}$ is very close to the end of the segment $s_i$ or the segment+shoulder portion $s_i+t_i$, giving a distance smaller than $D_{minseg}$. It is therefore not possible to change the slope between the point $S_{i1}$ and the end of the segment considered and the situation is then one where the flight profile is very little optimized.

Figure 4A:
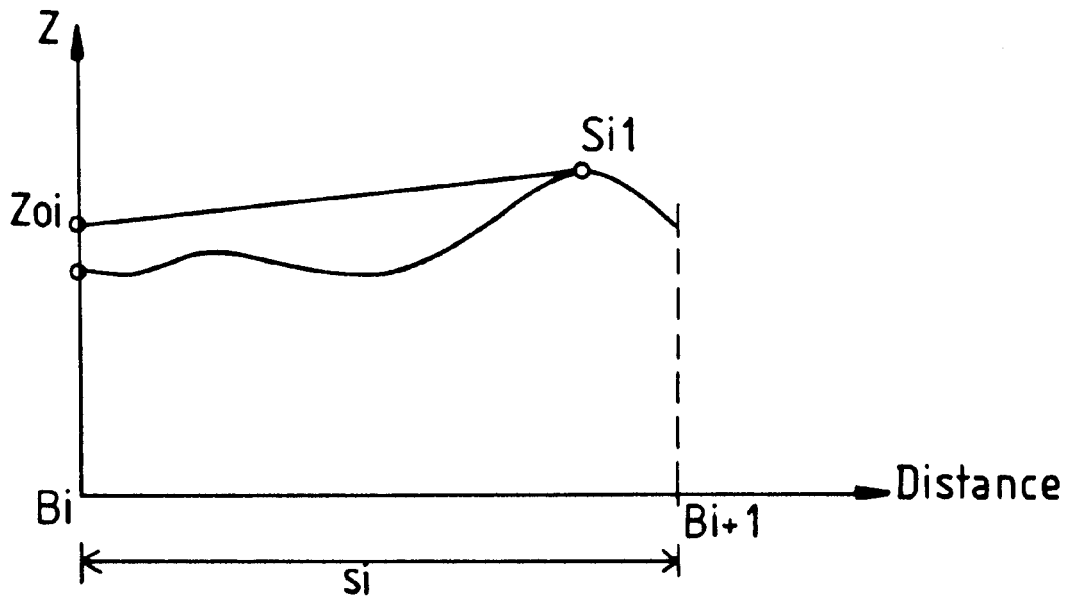
FIG. 4a illustrates an exemplary segment $s_i$ in which the determinant peak $S_{i1}$ is very close to the end of the segment.
Figure 4B:
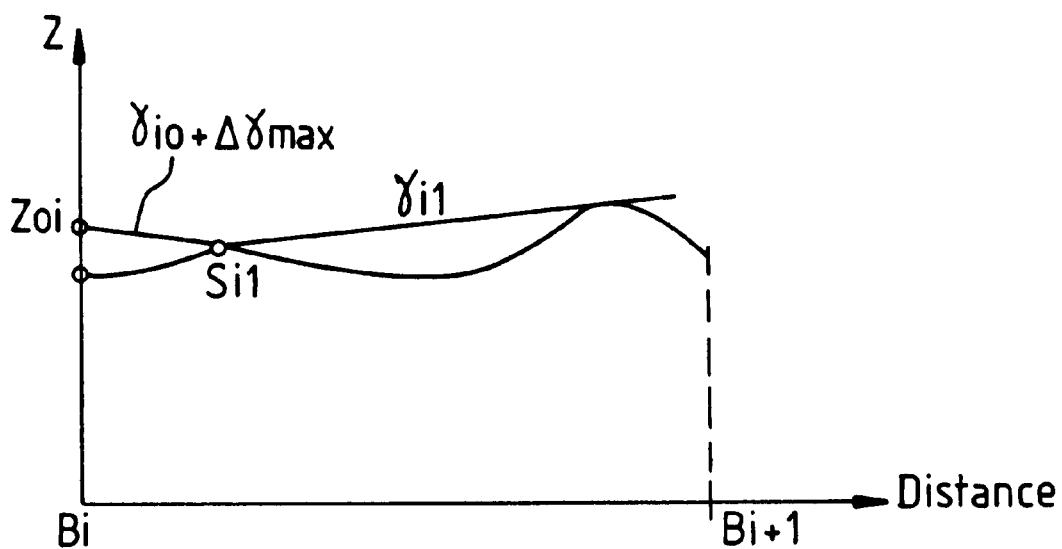
FIG. 4b illustrates the same exemplary segment $s_i$ as the one shown in FIG. 4a in which the position of the determinant peak $S_{i1}$ is modified.

In this case it is preferred to attempt a descent with the steepest possible slope at the beginning of a segment and then to join the end of the segment with a "tangential" slope of the type desired here above in the case of a short segment. FIGS. 4a and 4b show the shifting of the first determinant peak between the points $Z_{io}$ and $S_{i1}$. There is a straight line slope such that it meets the maximum slope changing constraint $\Delta\gamma_{max}$ on either side of a break point, in this case the point $Z_{io}$ corresponding to the position of the aircraft at the beginning of a segment. The following relationship must also be verified, namely $|\gamma_{i1}-\gamma_{io}|>|\Delta\gamma_{max}|$, in this case $\gamma_{i1}=\gamma_{io}+\Delta\gamma_{max}$ else $\gamma_{i1}=\gamma_{min}$, $\gamma_{io}$ being the slope of the path of the aircraft at the end of a previous segment $s_{i-1}$ in considering therefore that $\gamma_{i-1,n}=\gamma_{i,o}$.

2) The determinant peak $S_{i1}$ is very close to the start of the segment $s_i$, namely at a distance smaller than $D_{minseg}$. The position $S_{i1}$ is not brought into question while at the same time the "aircraft" constraints are met.

In any case, when the distance between one of the ends and the point $S_{i1}$ is greater than $2D_{minseg}$, a search is made for another determinant peak in said distance.

Thus, in the case where $d_{Si1,end} \geq 2d_{minseg}$ if $d_{Si1,end}$ corresponds to the distance between the determinant peak $S_{i1}$ and the end of the segment $s_i$ complemented by the shoulder portion $t_i$, it becomes necessary to search for a second determinant peak $S_{i2}$ on the basis of the point $S_{i1}$. It is possible to use the same algorithm as the one described in the case of the short segment to define the slope that is tangential to the relief between the points $S_{i1}$ and $S_{i2}$.

If the point $S_{i2}$ thus determined is very close to the point $S_{i1}$, namely $d_{Si1,Si2}<d_{minseg}$, it becomes necessary to modify the point $S_{i1}$ by extending the straight line with a slope $\gamma_{i1}$ over a distance equal to $d_{minseg}$. From this new point $S_{i1}$, a search is made for $S_{i2}$ and the slope $\gamma_{i2}$ that is at a tangent to the relief feature starting from the new point $S_{i1}$.

Case 3: Long navigation segment $s_i$

A segment si is defined as being long if it has at least two breaks in slopes and therefore possesses a segment distance:

$D_{segment} \geq 3D_{min,seg}$

Figure 5:
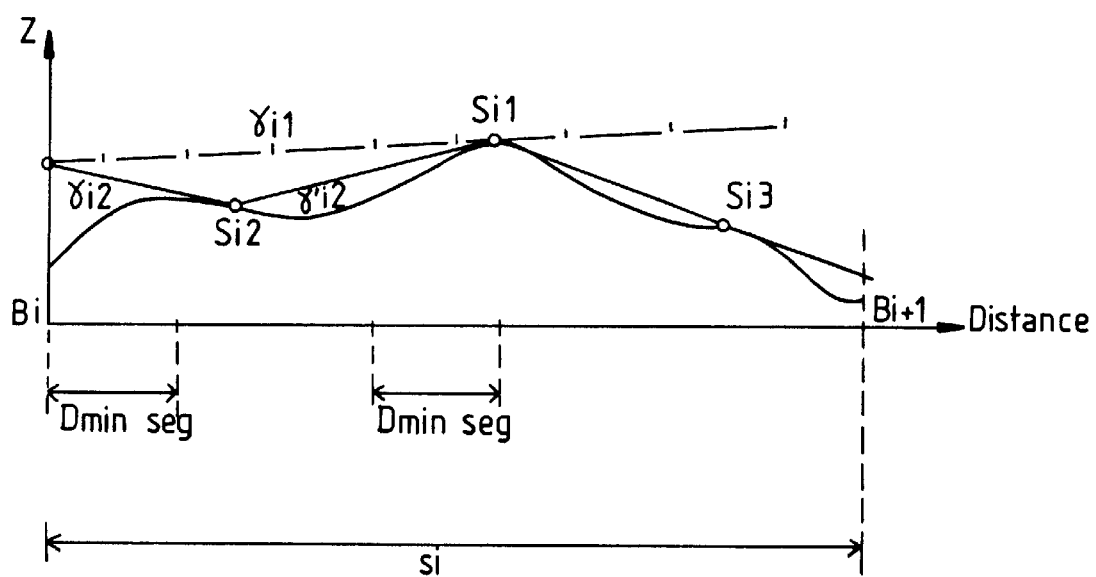
FIG. 5 illustrates an exemplary long segment $s_i$ in which several determinant peaks are defined successively.

The principle of preparation of the vertical profile is as follows:

a search is made for a determinant peak $S_{i1}$ on the entire segment in a manner similar to that described in the case of a short segment;

a search is made for a determinant peak $S_{i2}$ before $S_{i1}$ if the distance between the beginning of the segment and $S_{i1}$ is sufficient, namely $d_{Bi,Si1}>2d_{minseg}$ if this condition is verified. A peak $S_{i2}$ is obtained verifying the constraints:

$d_{Bi,Si2} \geq d_{minseg}$ and $d_{Si2,Si1} \geq d_{minseg}$ as shown in FIG. 5;

having determined the determinant peak $S_{i2}$ and therefore the slope $\gamma_{i2}$, the slope $\gamma'_{i2}$ between the points $S_{i2}$ and $S_{i1\,i}$ is deduced therefrom;

a search is also made for a determinant peak $S_{i3}$ after $S_{i1}$ if $d_{Si1,end} \geq 2d_{minseg}$ as described in the case of a mean segment. The determinant peak $S_{i3}$ verifies the following relationships:

$d_{Bi,Si2} \geq d_{minseg}$ and $d_{Si3,end} \geq d_{minseg}$ having determined $S_{i3}$ and therefore the slope $\gamma_{i3}$ between the points $S_{i1}$ and $S_{i3}$, it is possible to deduce therefrom the slope $\gamma'_{i3}$ between the point $S_{i3}$ and the end of the segment;

the procedure is conducted iteratively.

If the segment $s_i$ allows it, the previous process is repeated to determine intermediate determinant peaks between the previously defined sub-segments, namely between the beginning of the segment and the point $S_{i2}$, between the points $S_{i2}$ and $S_{i1}$, between the points $S_{i1}$ and $S_{i3}$, between the point $S_{i3}$ and the end of the segment, in continuing until the constraint on $D_{minseg}$ between two determinant peaks is reached.

The method used to determine determinant peaks and therefore the slopes tangential to the relief to be overflown is conducted for each of the navigation segments $s_i$.

What is claimed is:

1. A method of piloting an aircraft in low-altitude flight, comprising the following steps:

the determining, by the aircraft pilot, of goals $B_i$ on a cartographic screen so as to define a flight plan subdivided into segments $s_i$, each segment $s_i$ being defined between a goal $B_i$ and a goal $B_{i+1}$;

the determining, by a computer C in the aircraft, of horizontal paths $TH_i$ along the segments $s_i$;

the determining, by the computer C, of the ground profile to be overflown, said ground profile being defined on the basis of a set of highest points $P_{ij}$ located on a path $TH_i$ between a goal $B_i$ and a goal $B_{i+1}$;

the determining of a series of straight lines $Z_{io}S'_{i1}, \ldots, S'_{ik}S'_{ik+1}, S'_{in}Z_{in}$, with slopes $\Lambda_{ik}$ that are at a tangent to the ground profile;

$Z_{io}$ being the altitude of the aircraft positioned at the beginning of the segment, $S'_{i1}, \ldots, S'_{ik}, \ldots, S'_{in}$ being the determinant peaks defined among the points $P_{ij}$, $Z_{in}$ being an altitude of the aircraft sought in the vicinity of the end of the segment, said straight lines defining the vertical path flight instructions.

2. A method of piloting an aircraft in low-altitude flight, consisting in:

the determining of a first determinant peak $S_{i1}$ on the entire navigation segment $s_i$, giving a slope $\gamma_{i1}$ that is at a tangent to the relief of the segment $s_i$.

if the distance between the beginning of a segment $B_i$ and the point $S_{i1}$ is greater than twice the minimum distance between two determinant peaks, namely $2D_{minseg}$, the determining of a second determinant peak $S_{i2}$ defining a straight line with a slope $\gamma_{i2}$ between the start of a segment and $S_{i2}$ and a straight line with a slope $\gamma'_{i2}$ between the points $S_{i1}$ and the end of the segment;

if the distance between the point $S_{i1}$ and the end of the segment is greater than $2D_{minseg}$, the determining of a third determinant peak $S_{i3}$ defining slopes $\gamma_{i3}$ and $\gamma'_{i3}$ tangential to the relief on either side of the point $S_{i3}$;

the iterating of the search for determinant peaks in each newly defined sub-segment until the distance $D_{minseg}$ between two consecutive determinant peaks is reached.

3. A method of piloting an aircraft in low-altitude flight according to one of the claims 1 or 2, wherein the determining of a determinant peak includes the verification of the following constraints:

the change of slope on either side of a determinant peak is below a standard value $\Delta\gamma_{max}$ defined for any flight plan, the defined slopes $\gamma_{ik}$ are sandwiched by slopes $\gamma_{min}$ and $\gamma_{max}$ of the aircraft, giving a maximum diving slope and a maximum nosing-up slope.

4. A method of piloting an aircraft in low-altitude flight according to claim 3, wherein the pilot determines the goals $B_i$ by means of a joystick type of game controller device.

5. A method of piloting an aircraft in low-altitude flight according to claim 3, wherein the pilot determines the goals $B_i$ by action on a touch screen.

6. A method of piloting an aircraft in low-altitude flight according to claim 3, wherein the pilot determines the goals $B_i$ by voice command.

7. A method of piloting an aircraft in low-altitude flight according to claim 3, wherein the vertical path flight instructions are presented to the pilot:

firstly in the form of general flight instructions on a window of the cartographic screen showing all the straight lines ($Z_{oi}S'_{i1}$), secondly in the form of flight instructions provided at specific instants on a head-up visor.

* * * * *